Figure 1:
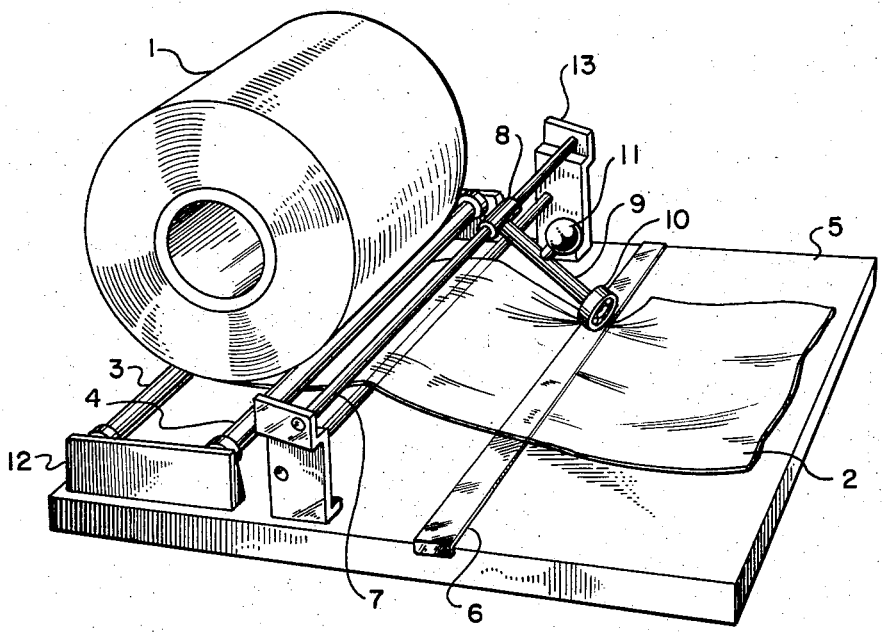

Aug. 4, 1964    K. G. S. ADDIN    3,143,023
APPARATUS FOR CUTTING THIN LIMP FOILS OR SHEETS
Filed Dec. 28, 1961

United States Patent Office 3,143,023
Patented Aug. 4, 1964

3,143,023
APPARATUS FOR CUTTING THIN LIMP FOILS OR SHEETS
Karl G. S. Addin, Landskrona, Sweden, assignor to W. R. Grace & Co., Cambridge, Mass., a corporation of Connecticut
Filed Dec. 28, 1961, Ser. No. 162,782
5 Claims. (Cl. 83—472)

This invention relates to an apparatus for cutting thin limp webs, foils, or sheets, which materials have proved to be difficult to cut by apparatus heretofore successfully employed in cutting self-supporting materials.

For example, in order to cut thin metal foils with some degree of success, the material must be sufficiently self-supporting so that it will not crease or pile up in front of the cutting instrument in the direction of the cutting line. If a sharp knife edge were drawn across a thin foil, the forces acting laterally against the foil will tend to pile up the foil ahead of the knife edge and would produce uneven tearing of the foil.

It has also been proposed in the past to employ heated cutting surfaces or heated wires to cut these limp materials. The use of heated cutting surfaces introduces its own problems and hazards and has not proved to be the answer to the problem. High melting materials are not effectively cut by heated knife edges.

It is among the objects of the present invention to provide an apparatus which is simple in construction and which can cleanly and quickly cut a wide variety of thin, limp materials.

The successful cutting of thin, limp materials—e.g., plastic films, metal foils—is accomplished as follows: the web of material being cut is placed against a flat, smooth cutting rail or bed, and a wheel having a cutting edge is brought to bear against the web above the cutting rail, and pressure is exerted through the wheel against the web and laterally to the web causing the cutting edge to be rolled along the cutting rail and to progressively cut the web beneath the cutting edge.

The following detailed description, taken in conjunction with the accompanying drawing, is of a preferred embodiment, and it is to be understood that the invention is not limited to the specific form disclosed. On the contrary, the invention is to cover all modifications, alternative constructions and equivalents, and uses falling within the spirit and scope of the invention as set forth in the claims.

FIGURE 1 is a perspective view of the apparatus of the present invention.

A supply roll 1 of thin, limp thermoplastic film—e.g., 0.5 mil polyethylene—is placed upon a roll stand which comprises two parallel support rollers 3 and 4, which are freely revolvable in bearings that are located on upwardly extending side plates 12, mounted on the base 5 of the cutting apparatus. The film 2 is drawn from beneath the roll and passes beneath roller 4.

On the top side of the base 5 and parallel with the axis of the supply roll 1 is located a cutting rail or bed 6 which is made of some hard material—e.g., glass—which has a smooth top surface. As shown in FIGURE 1, the cutting rail is preferably inserted into the base 5 and is flush with the top of said base.

Extending upwardly from the base is a pair of upright support posts 13. A guide rod 7 is supported by said posts 13 above the base and parallel with the axis of the supply roll. Slideable along the length of said guide rod 7 is a slide guide 8 which is a tubular structure that fits around the guide rod. The slide guide is also capable of rotation about the axis of the guide rod. Arm 9 is attached at one end to the slide guide and at the opposite end has mounted thereto a cutting wheel 10.

A hand grip 11 is located on the arm. Arm 9 is perpendicular to the axis of the guide rod 7. The cutting wheel is free wheeling and rotates on a plane perpendicular to the axis of the arm. It is necessary that the wheel turn easily, and to accomplish this, the outer edge of the wheel turns on ball bearings. As shown in the drawing, the arm is rotated until the cutting wheel is brought to bear against the cutting rail. The outer edge of the cutting wheel that bears against the cutting rail has been machined or ground to a sharp edge. Lateral movement of the arm along the guide rail, while the ground edge is held in contact with the cutting rail, causes the cutting wheel to rotate about its axis.

In operation, the film 2 is drawn from the supply roll along the base and over the cutting rail 6 until the desired length of film has crossed the cutting rail. The arm 9 is rotated about the guide rod until the edge of the cutting wheel 10 contacts the cutting rail adjacent one side edge of the film. The cutting wheel is then drawn transversely across the film, and slight pressure is exerted downwardly causing the edge to cut through the film. Slight pressure is sufficient to cut through the film at the point of tangency between the cutting rail and cutting edge.

For practical reasons, the cutting edge should have a hardness that at the most is the same as the cutting rail. The rail can be made of glass or some other hard surface. The cutting wheel can be made of a ball bearing which, in cutting position, is inclined with relation to the cutting rail and has a sharp edge that lies against the cutting rail.

The apparatus of the present invention makes it possible to obtain straight, nick-free, cuts with all types of thin web materials.

I claim:
1. Apparatus for transversely cutting thin, limp webs which comprises:
   (a) a base,
   (b) a hard, flat, smooth cutting rail secured to the base,
   (c) a guide rod supported above said base and parallel with said cutting rail,
   (d) a slide guide movable along said guide rod and rotatable about the axis of said guide rod,
   (e) an arm rigidly secured at one extremity to the slide guide, and
   (f) a freely turning roller wheel, composed of material not harder than said rail, mounted on the opposite extremity of said arm and rotatable in a plane perpendicular to the axis of said arm, the rolling edge of said wheel thus inclined as to the top surface of said rail, and having a sharpened cutting edge extending about the periphery of its outer rolling edge, said cutting edge only being adapted to bear against the top of the flat cutting rail and caused to roll along the said top surface over which said unrestrained film has been positioned.

2. Apparatus for transversely cutting thin, limp webs which comprises:
   (a) a base,
   (b) a hard, flat, smooth cutting rail secured to said base and extending across said base,
   (c) a guide rod supported above said base by support plates located at opposite sides of said base, said guide rod being parallel with said cutting rail,
   (d) a tubular slide guide movable along said guide rod and rotatable about the axis of said guide rod,
   (e) an arm rigidly secured at one extremity to the slide guide, and
   (f) a freely turning roller wheel, composed of material not harder than said rail, mounted on the opposite extremity of said arm and rotatable in a plane perpendicular to the axis of said arm, the rolling edge of said wheel thus inclined as to the top surface of said rail, and having a sharpened cutting edge extending about the periphery of its outer rolling edge, said cutting edge only being adapted to bear against the top of the flat cutting rail and caused to roll along the said top surface over which said unrestrained film has been positioned.

3. Apparatus for transversely cutting thin, limp webs which comprises:
(a) a base,
(b) means mounted on said base to support a supply roll of the web material,
(c) a hard, flat, smooth cutting rail secured to the base and perpendicular to the long axis of said base,
(d) a guide rod supported above said base and parallel with said cutting rail,
(e) a slide guide movable along said guide rod and rotatable about the axis of said guide rod,
(f) an arm rigidly secured at one end thereof to said slide guide, and
(g) a freely turning roller wheel, composed of material not harder than said rail, mounted on the opposite extremity of said arm and rotatable in a plane perpendicular to the axis of said arm, the rolling edge of said wheel thus inclined as to the top surface of said rail, and having a sharpened cutting edge extending about the periphery of its outer rolling edge, said cutting edge only being adapted to bear against the top of the flat cutting rail and caused to roll along the said top surface over which said unrestrained film has been positioned.

4. Apparatus for transversely cutting thin, limp webs which comprises:
(a) a base,
(b) means mounted on said base to support a supply roll of the web material,
(c) a hard, flat, smooth cutting rail secured to said base and perpendicular to the travel of the web across said base,
(d) a guide rod supported above said base by support elements extending upwardly from opposite sides of said base, said guide rod parallel with said cutting rail,
(e) a slide guide movable along the length of said guide and rotatable about the axis of said guide rod,
(f) an arm rigidly secured at one extremity to the slide guide, and
(g) a freely turning roller wheel, composed of material not harder than said rail, mounted on the opposite extremity of said arm and rotatable in a plane perpendicular to the axis of said arm, the rolling edge of said wheel thus inclined as to the top surface of said rail, and having a sharpened cutting edge extending about the periphery of its outer rolling edge, said cutting edge only being adapted to bear against the top of the flat cutting rail and caused to roll along the said top surface over which said unrestrained film has been positioned.

5. Apparatus according to claim 4 wherein said wheel rotates about said arm on ball bearings.

References Cited in the file of this patent

UNITED STATES PATENTS

| | | |
|---|---|---|
| 760,800 | Nice | May 24, 1904 |
| 808,661 | Jacobson | Jan. 2, 1906 |
| 1,376,018 | Kane | Apr. 26, 1921 |
| 1,666,969 | James | Apr. 24, 1928 |
| 1,802,457 | Cameron | Apr. 28, 1931 |
| 2,000,175 | Johnstone et al. | May 7, 1935 |
| 2,130,818 | Soderberg | Sept. 20, 1938 |
| 2,374,847 | Vollrath | May 1, 1945 |
| 2,400,527 | Aycock | May 21, 1946 |
| 2,683,489 | Jackman | July 13, 1954 |
| 2,802,528 | Mastriani | Aug. 13, 1957 |
| 2,897,893 | Rockstrom et al. | Aug. 4, 1959 |
| 3,011,246 | Castine | Dec. 5, 1961 |

FOREIGN PATENTS

| | | |
|---|---|---|
| 808,661 | Canada | Jan. 2, 1906 |